United States Patent [19]

Yamada et al.

[11] Patent Number: 5,172,299
[45] Date of Patent: Dec. 15, 1992

[54] MULTILAYER CAPACITOR

[75] Inventors: Hideshi Yamada; Noboru Kato, both of Nagaokakyo, Japan

[73] Assignee: Murata Manufacturing Co., Inc., Japan

[21] Appl. No.: 687,846

[22] Filed: Apr. 19, 1991

[30] Foreign Application Priority Data

Apr. 26, 1990 [JP] Japan .................. 2-113077

[51] Int. Cl.[5] .............................................. H01G 4/42
[52] U.S. Cl. ................................................. 361/321
[58] Field of Search ............................. 361/303–305, 361/328–330, 320, 321, 324, 323

[56] References Cited

U.S. PATENT DOCUMENTS

| | | | |
|---|---|---|---|
| 1,899,176 | 2/1933 | Bailey | 361/303 X |
| 3,292,063 | 12/1966 | Kellerman | 361/323 X |
| 4,556,929 | 12/1985 | Tanaka et al. | 361/321 |
| 4,729,058 | 3/1988 | Gupta et al. | 29/25.42 X |

*Primary Examiner*—Donald A. Griffin
*Attorney, Agent, or Firm*—Ostrolenk, Faber, Gerb & Soffen

[57] ABSTRACT

A multilayer capacitor in which a plurality of inner electrodes are laminated while being separated by dielectric layers in a dielectric body, each of the inner electrodes having a plurality of inner electrode fingers formed while being separated by gaps, and respective ones of the plurality of inner electrode fingers having at least two different widths.

12 Claims, 14 Drawing Sheets

MULTILAYER CAPACITOR

BACKGROUND OF THE INVENTION

1. Field of the Invention

The present invention relates generally to multilayer capacitors, and more particularly, to multilayer capacitors having an improvement in the structure of their inner electrodes.

2. Description of the Prior Art

An example of a conventional multilayer capacitor will be described with reference to FIGS. 16A to 17B. This multilayer capacitor is constructed using a sintered body 5 obtained by alternately laminating ceramic green sheets 1 each composed of dielectric ceramics having an inner electrode 2 formed on one surface and ceramic green sheets 3 each composed of dielectric ceramics having an inner electrode 4 formed on one surface, as shown in FIGS. 16A and 16B, pressing the laminated body thus obtained in the direction of thickness and then, cofiring the same.

More specifically, in the sintered body 5, the above inner electrodes 2 and 4 are laminated while being separated by dielectric layers, as shown in FIGS. 17A and 17B. In addition, outer electrodes 6 and 7 are formed on both end surfaces of the sintered body 5. Capacitance is formed between the inner electrodes 2 and 4 which are overlapped with each other while being separated by the dielectric layer.

The inner electrodes 2 and 4 are made of a noble metal such as Pd or an Ag-Pd alloy. Consequently, the above described multilayer capacitor has the disadvantage of being high in fabricating cost because the area of each of the inner electrodes 2 and 4 is large and the inner electrodes 2 and 4 are made of a high-cost noble metal material.

As disclosed in Japanese Patent Laid-Open Gazette No. 156619/1990, a multilayer capacitor using inner electrodes each having a plurality of inner electrode fingers has been proposed. The multilayer capacitor of this type will be described in accordance with FIGS. 18A to 19. In this multilayer capacitor, a ceramic green sheet 11 having an inner electrode 12 having a plurality of inner electrode fingers 12a printed thereon and a ceramic green sheet 13 having an inner electrode 14 having a plurality of inner electrode fingers 14a printed thereon are used, and the plurality of inner electrode fingers 12a and 14a are formed so as to have the same width and to be respectively arranged while being separated by gaps 15 and 16 having the same width.

In the multilayer capacitor using the above described inner electrodes 12 and 14, the plurality of inner electrode fingers 12a and 14a are arranged so as to be overlapped with each other while being separated by dielectric layers 5a, as shown in a cross sectional view of FIG. 19. In this structure, an electric field is concentrated at the edges each of the inner electrode fingers 12a and 14a so that a phenomenon referred to as the so-called edge effect occurs, thereby making it possible to increase the capacitance by 20 to 30%, as compared with the above described multilayer capacitor using the inner electrodes 2 and 4 having the same area. Accordingly, although both structures obtain the same given capacitance, the area of each of the inner electrodes can be decreased in the multilayer capacitor having the structure shown in FIGS. 18A to 19, as compared with the multilayer capacitor shown in FIGS. 17A and 17B. Consequently, the multilayer capacitor shown in FIG. 19 can be lowered in fabricating cost.

However, disadvantageously, the inner electrodes 12 and 14 respectively have the plurality of inner electrode fingers 12a and 14a. Accordingly, in respectively forming the inner electrodes 12 and 14 on the ceramic green sheets 11 and 13 or in laminating the ceramic green sheets 11 and 13, if the inner electrodes 12 and 14 which are overlapped with each other in the vertical direction are shifted in the lateral direction (shifted in the direction represented by arrow P in FIG. 19), a portion appears where the inner electrode fingers 12a and 14a are not overlapped with each other in the direction of thickness. Consequently, the multilayer capacitor shown in FIG. 19 has the disadvantage of varying in capacitance very largely as represented by a solid line C in FIG. 7 depending on the amount of the above described shift between the inner electrodes in the lateral direction.

Another multilayer capacitor using inner electrodes 32 and 34 shown in FIGS. 20A and 20B has been proposed so as to reduce the above described variation in capacitance. In this multilayer capacitor, the inner electrode 32 has a plurality of inner electrode fingers 32a, and the other inner electrode 34 is formed in a rectangular shape having no inner electrode fingers. The inner electrodes 32 and 34 are alternately laminated, to constitute a multilayer capacitor shown in a schematic cross sectional view of FIG. 21.

As obvious from FIG. 21, the plurality of inner electrode fingers 32a are overlapped with the inner electrode 34 uniformly formed in the lateral direction while being separated by a dielectric layer 5a. Consequently, even if the inner electrode 32 having the plurality of inner electrode fingers 32a and the inner electrode 34 are shifted in the lateral direction, that is, in the direction represented by an arrow P in FIG. 21, the variation in capacitance is reduced. In the multilayer capacitor shown in FIG. 21, however, the inner electrode 34 is printed over a large area so as to have a rectangular shape, as shown in FIG. 20B. Consequently, the multilayer capacitor shown in FIG. 21 has the disadvantage of being high in cost. Moreover, it is also found that the multilayer capacitor shown in FIG. 21 has the disadvantage of being lowered in breakdown voltage.

SUMMARY OF THE INVENTION

Accordingly, an object of the present invention is to eliminate the above described disadvantages in the conventional multilayer capacitors and to provide multilayer capacitors which can be lowered in cost by utilizing inner electrodes each having a plurality of inner electrode fingers and which do not largely vary in capacitance.

The present invention provides a multilayer capacitor having a structure in which a plurality of inner electrodes are laminated while being separated by dielectric layers, which comprises a dielectric body, and a plurality of inner electrodes arranged in the dielectric body so as to be overlapped with each other while being separated by dielectric layers, each of the above inner electrodes having a plurality of inner electrode fingers formed while being separated by gaps, and the width of each of the plurality of inner electrode fingers being so set that the widths of the inner electrode fingers are of at least two types. The multilayer capacitor is characterized by further comprising outer electrodes formed on a pair of end surfaces of the above dielectric body so as to be electrically connected to predetermined inner electrodes out of the above plurality of inner electrodes.

The multilayer capacitor according to the present invention is so constructed that each of inner electrodes has a plurality of inner electrode fingers, thereby allowing the capacitance to be increased due to the above described edge effect. More specifically, while the same capacitance is obtained, the area of each of the inner electrodes can be reduced. Accordingly, the multilayer capacitor can be lowered in cost even when a noble metal is used as a material.

Furthermore, as mentioned, the plurality of inner electrode fingers are formed so as to have two or more types of widths. A pair of inner electrode fingers are overlapped with each other while being separated by a dielectric layer, the inner electrode finger having a relatively small width being arranged so as to be opposed to the inner electrode finger having a relatively large width while being separated by the dielectric layer. Accordingly, even if there is a shift in position between the pair of inner electrode fingers, the one having a relatively small width is moved in most cases within the area of the inner electrode finger having a relatively large width. The narrower inner electrode finger will not easily be forced out of the area of the inner electrode finger having a relatively large width even if the shift in position occurs in the lateral direction between the inner electrode finger having a relatively large width and the inner electrode finger having a relatively small width. Consequently, the undesired variation in capacitance can be effectively reduced.

Moreover, as will be explained in connection with the embodiments as described later, the inductance of the multilayer capacitor can be reduced because each of inner electrodes is formed so as to have a plurality of inner electrode fingers.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17A is a sectional side elevation view and FIG. 17B is a front sectional view taken along a line X—X shown in FIG. 17A;

DESCRIPTION OF THE PREFERRED EMBODIMENTS

Figure 1:
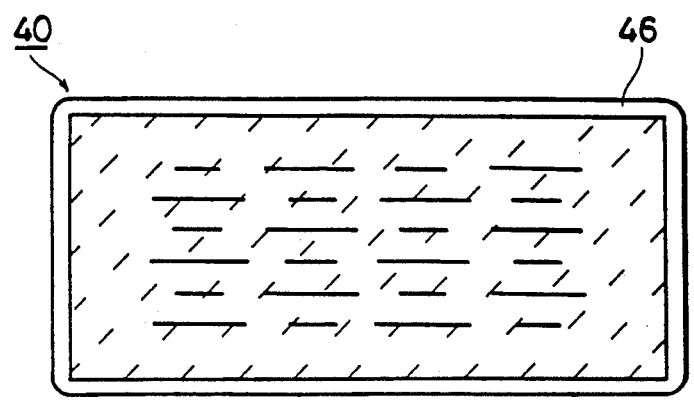
FIG. 1 is a front sectional view, which is taken along a line I—I shown in FIG. 2, showing a multilayer capacitor according to a first embodiment of the present invention.
Figure 2:
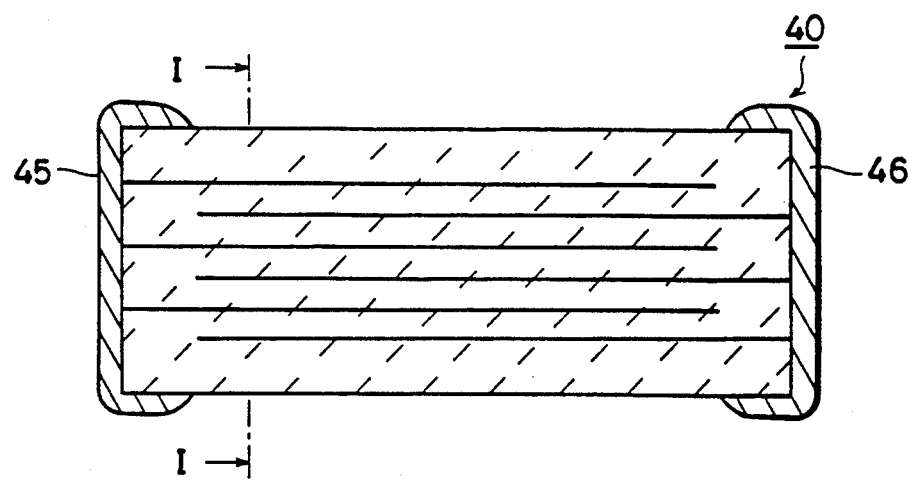
FIG. 2 is a sectional side elevation view showing the multilayer capacitor according to the first embodiment of the present invention.

FIGS. 1 and 2 are a front sectional view and a sectional side elevation view showing a multilayer capacitor according to a first embodiment of the present invention. A multilayer capacitor 40 according to the present embodiment is constructed using inner electrodes respectively having plane shapes shown in FIGS. 3A and 3B.

Figure 3A:
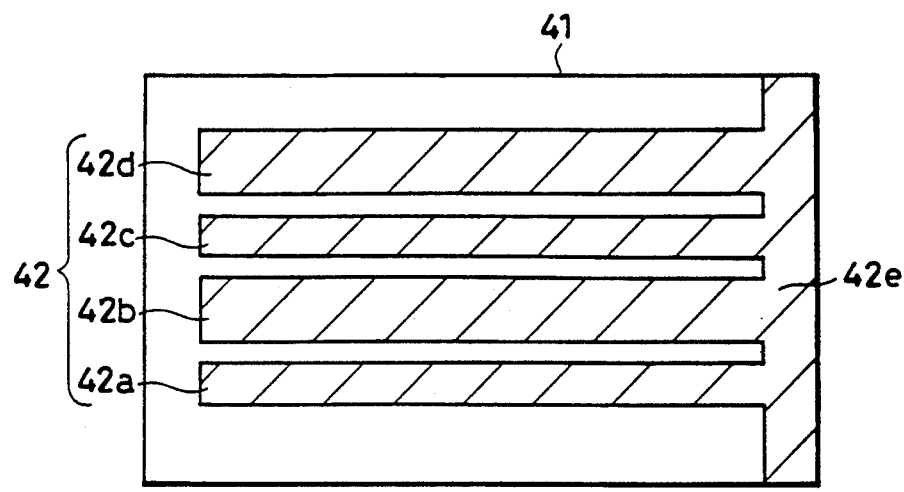
FIGS. 3A and 3B are plan views for expalining the shapes of inner electrodes used in the first embodiment, respectively.

More specifically, as shown in FIG. 3A, an inner electrode 42 having a plurality of inner electrode fingers 42a to 42d is formed on a ceramic green sheet 41 mainly composed of dielectric ceramics. The plurality of inner electrode fingers 42a to 42d are electrically connected to each other by a connecting conductive portion 42e formed along one edge of the ceramic green sheet 41. Similarly, an inner electrode 44 having a plurality of inner electrode fingers 44a to 44d is formed on a ceramic green sheet 43. Also in the inner electrode 44, the plurality of inner electrode fingers 44a to 44d are electrically connected to each other by a connecting conductive portion 44e.

The plurality of inner electrode fingers 42a to 42d comprise the inner electrode fingers 42a and 42c having a relatively small width and the inner electrode fingers 42b and 42d having a relatively large width. Similarly, the plurality of inner electrode fingers 44a to 44d comprise the inner electrode fingers 44a and 44c having a relatively large width and the inner electrode fingers 44b and 44d having a relatively small width. In addition, the widths of gaps between the inner electrode fingers 42a to 42d and the widths of gaps between the inner electrode fingers 44a to 44d are made equal to each other.

Figure 3B:
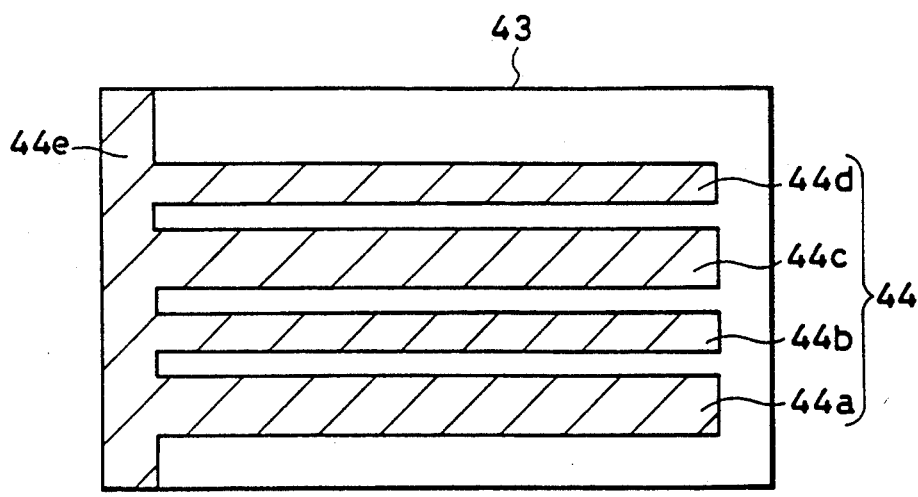

The above described inner electrodes 42 and 44 are generally formed by respectively printing conductive paste containing a noble metal such as Ag or Ag-Pd on the ceramic green sheets 41 and 43. In the multilayer capacitor 40 according to the present embodiment is fabricated by alternately laminating a plurality of ceramic green sheets 41 and 43 as shown in FIGS. 3A and 3B, pressing a laminated body obtained in the direction of thickness and firing the same to obtain a sintered body, and forming outer electrodes 45 and 46 (see FIG. 2) on both end surfaces of the sintered body. The processes of laminating ceramic green sheets and inner electrodes, cofiring a laminated body obtained, and forming outer electrodes can be easily carried out in accordance with the conventionally well-known method of fabricating a multilayer capacitor.

Figure 4A:
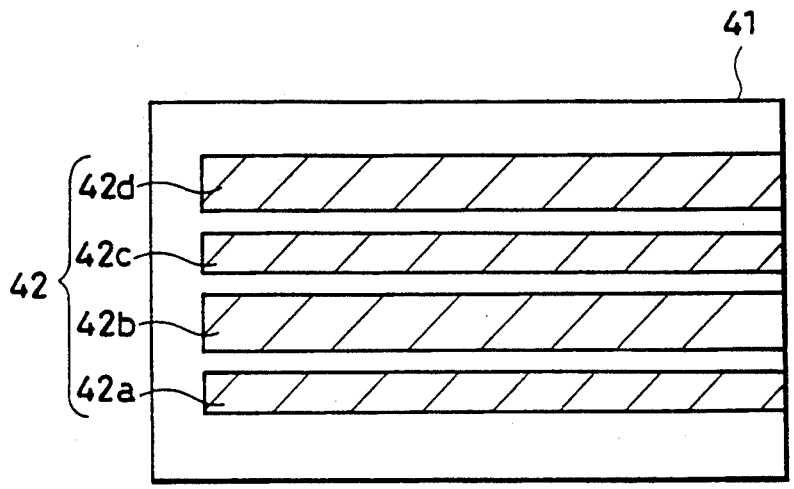
FIGS. 4A and 4B are plan views for explaining a modified example of the inner electrodes used in the first embodiment, respectively.
Figure 4B:
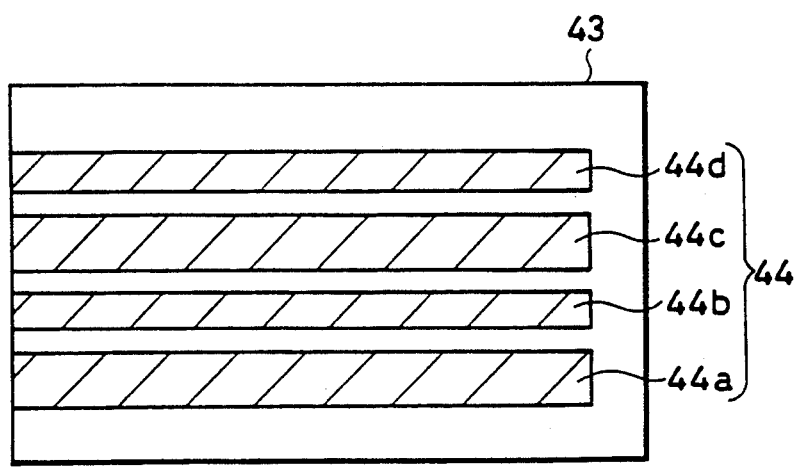

In the multilayer capacitor according to the first embodiment, the connecting conductive portions 42e and 44e are formed for respectively connecting the plurality of inner electrode fingers 42a to 42d and the plurality of inner electrode fingers 44a to 44d in the inner electrodes 42 and 44. If the plurality of inner electrode fingers can be electrically connected to the outer electrodes reliably, however, the connecting conductive portions need not be formed, as shown in FIGS. 4A and 4B. More specifically, the inner electrodes 42 and 44 may be respectively formed so as to have only the plurality of inner electrode fingers 42a to 42d and the plurality of inner electrode fingers 44a to 44d.

Figure 5:
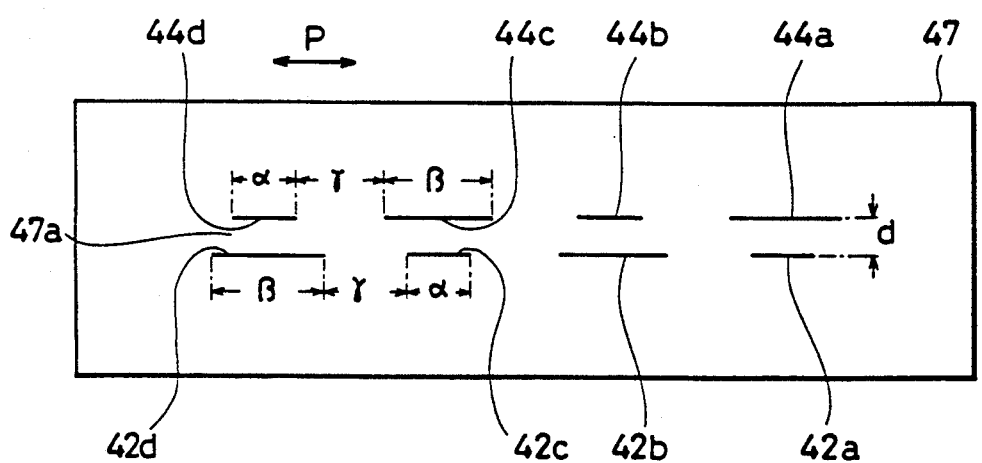
FIG. 5 is a schematic front sectional view for explaining the dimensions related to inner electrode fingers in the inner electrodes in the multilayer capacitor according to the first embodiment.

A state where the inner electrodes 42 and 44 are overlapped with each other in the multilayer capacitor obtained in the first embodiment is shown in a schematic cross sectional view of FIG. 5. As obvious from FIG. 5, the inner electrode fingers 42a to 42d and the inner electrode fingers 44a to 44d are arranged so as to be overlapped with each other while being separated by a dielectric layer 47a in a sintered body 47 serving as a dielectric body. In the present embodiment, the inner electrode fingers 42a and 42c having a relatively small width are respectively overlapped with the inner electrode fingers 44a and 44c having a relatively large width while being separated by the dielectric layer 47a. Similarly, the inner electrode fingers 42b and 42d having a relatively large width are respectively overlapped with the inner electrode fingers 44b and 44d having a relatively small width while being separated by the dielectric layer 47a.

Referring now to FIGS. 5 to 9, description is made of the fact that even if the inner electrodes 42 and 44 are laterally shifted in the multilayer capacitor according to the first embodiment, the capacitance does not easily vary.

As shown in FIG. 5, the total number of inner electrodes is two, and $\alpha$ is taken as the width of the inner electrode fingers 42a, 42c, 44b and 44d having a relatively small width, $\beta$ is taken as the width of the inner electrode fingers 42b, 42d, 44a and 44c having a relatively large width, $\gamma$ is taken as the width of the gaps between the inner electrode fingers, and d is taken as the thickness of the dielectric layer 47a. In this case, the dimensions $\alpha$, $\beta$, $\gamma$ and d are respectively set to 0.088 mm, 0.132 mm, 0.110 mm and 0.050 mm. That is, the ratio $\beta/\alpha$ of the width of the inner electrode fingers having a relatively large width to the width of the inner electrode fingers having a relatively small width is 1.5.

Figure 6:
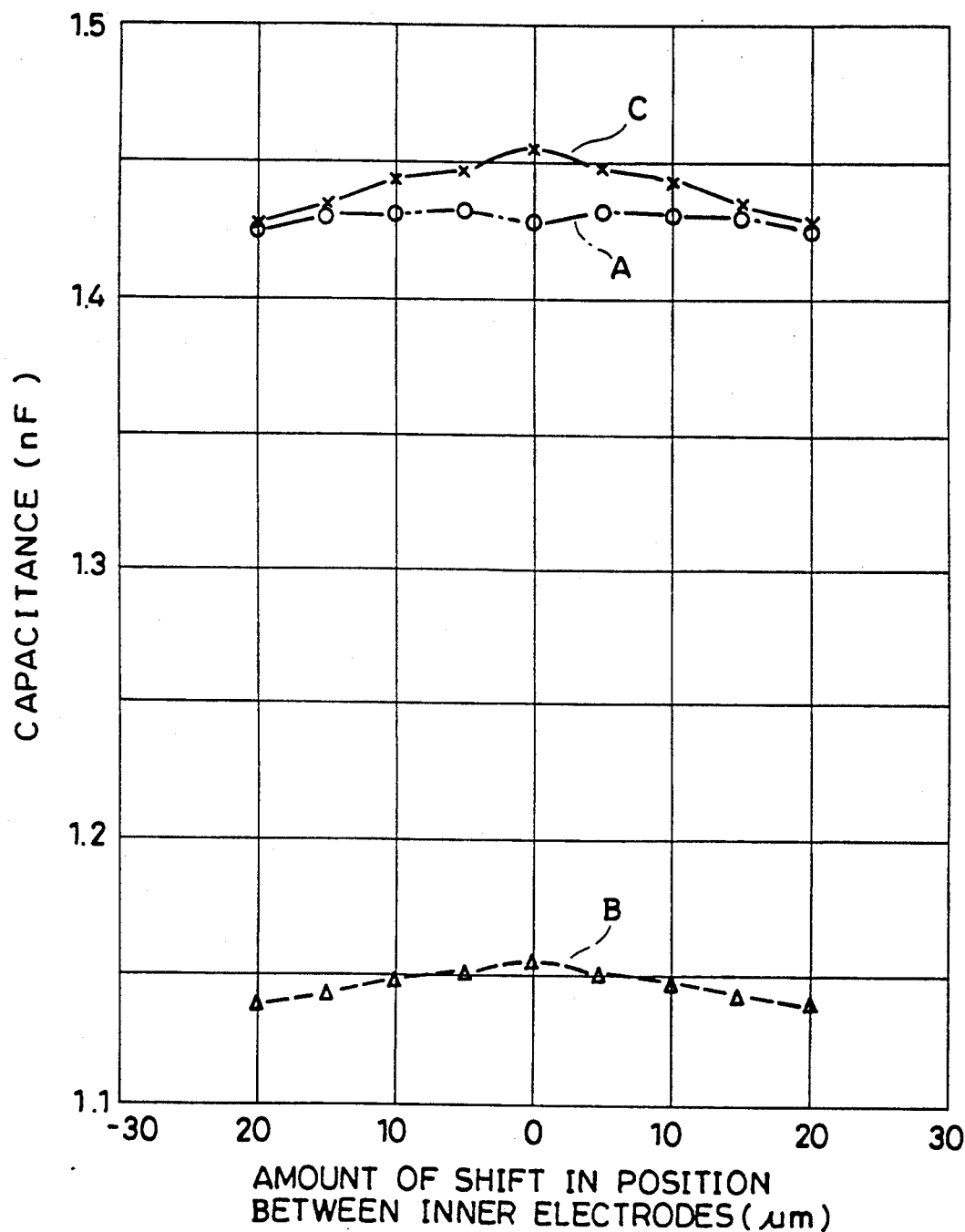
FIG. 6 is a diagram showing the relation between the amount of shift in position between inner electrodes and the capacitance in the multilayer capacitor according to the first embodiment and conventional multilayer capacitors.

In the multilayer capacitor constructed as described above, the relation between the capacitance and the amount of shift in position which occurs between the inner electrodes 42 and 44 in the lateral direction, that is, the direction represented by an arrow P shown in FIG. 5 is represented by a one dot and dash line A in FIG. 6.

Figure 18A:
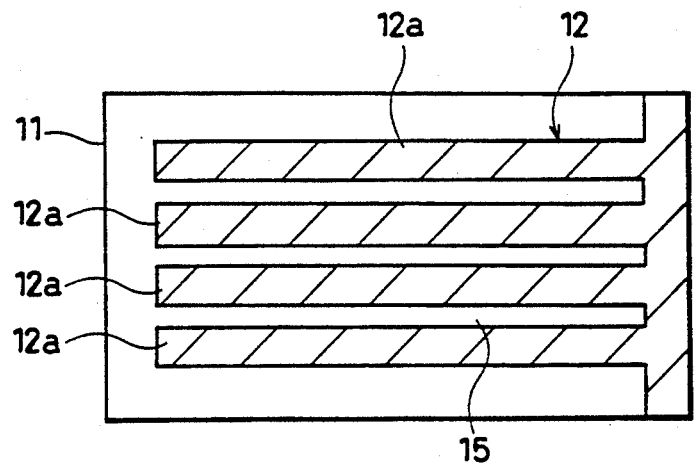
FIGS. 18A and 18B are plan views for explaining the shapes of inner electrodes used in another example of the conventional multilayer capacitors, respectively.
Figure 18B:
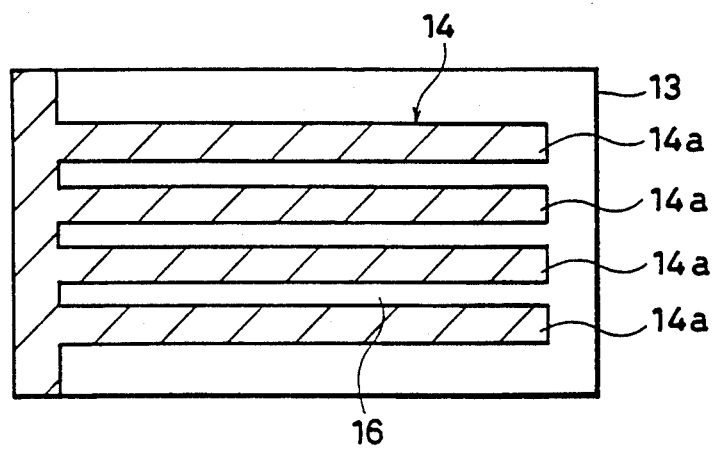
Figure 19:
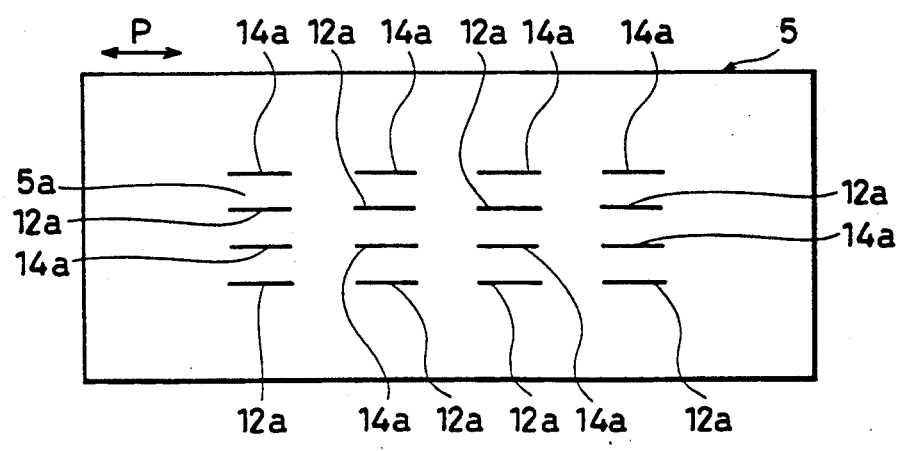
FIG. 19 is a schematic front sectional view showing another example of the conventional multilayer capacitors.
Figure 20A:
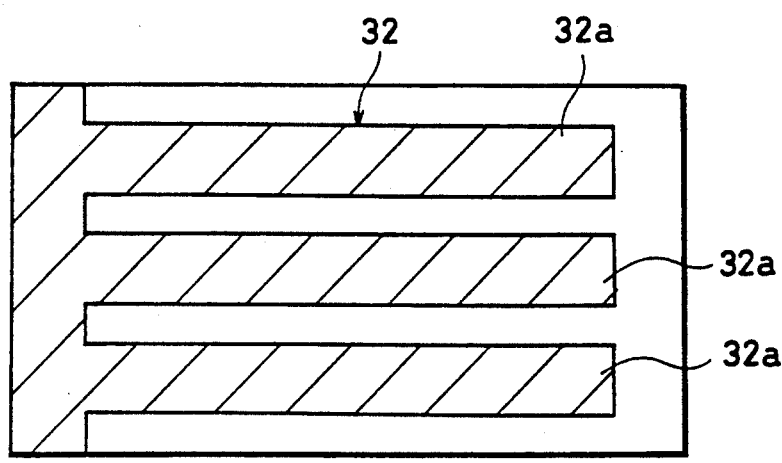
FIGS. 20A and 20B are plan views for explaining the shapes of inner electrodes used in still another example of the conventional multilayer capacitors, respectively.
Figure 20B:
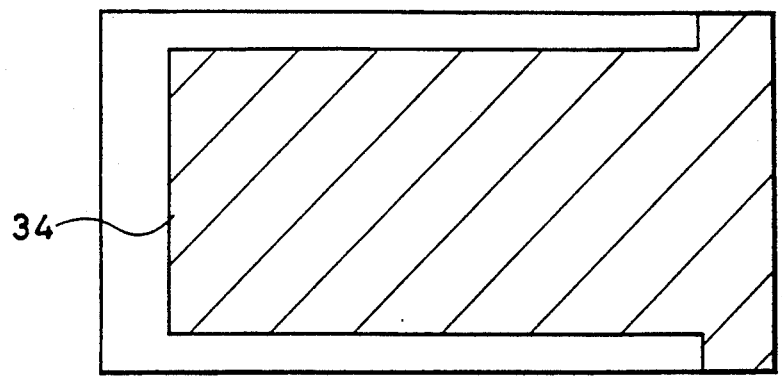
Figure 21:
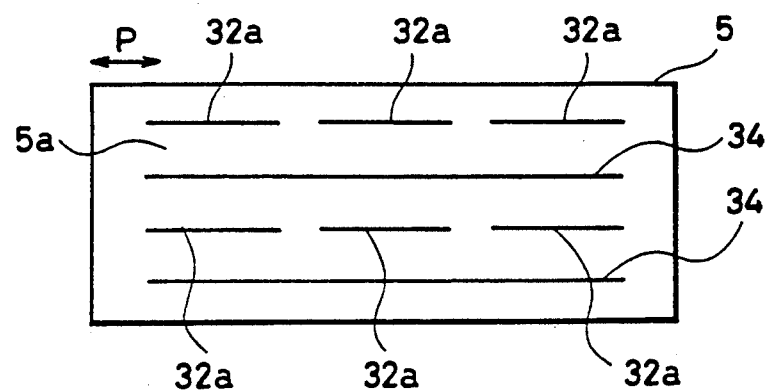
FIG. 21 is a schematic front sectional view showing still another example of the conventional multilayer capacitors.

For comparison, the relation between the amount of shift in position between inner electrodes and the capacitance in the conventional multilayer capacitor shown in FIG. 16A to FIG. 17B so constructed that the number of inner electrodes is the same as that in the multilayer capacitor according to the first embodiment and the inner electrodes have the same area is represented by a broken line B, and the relation between the amount of shift in position between inner electrodes and the capacitance in the conventional multilayer capacitor shown in FIG. 18A to FIG. 19 so constructed that inner electrodes have the same area is represented by a solid line C.

Figure 7:
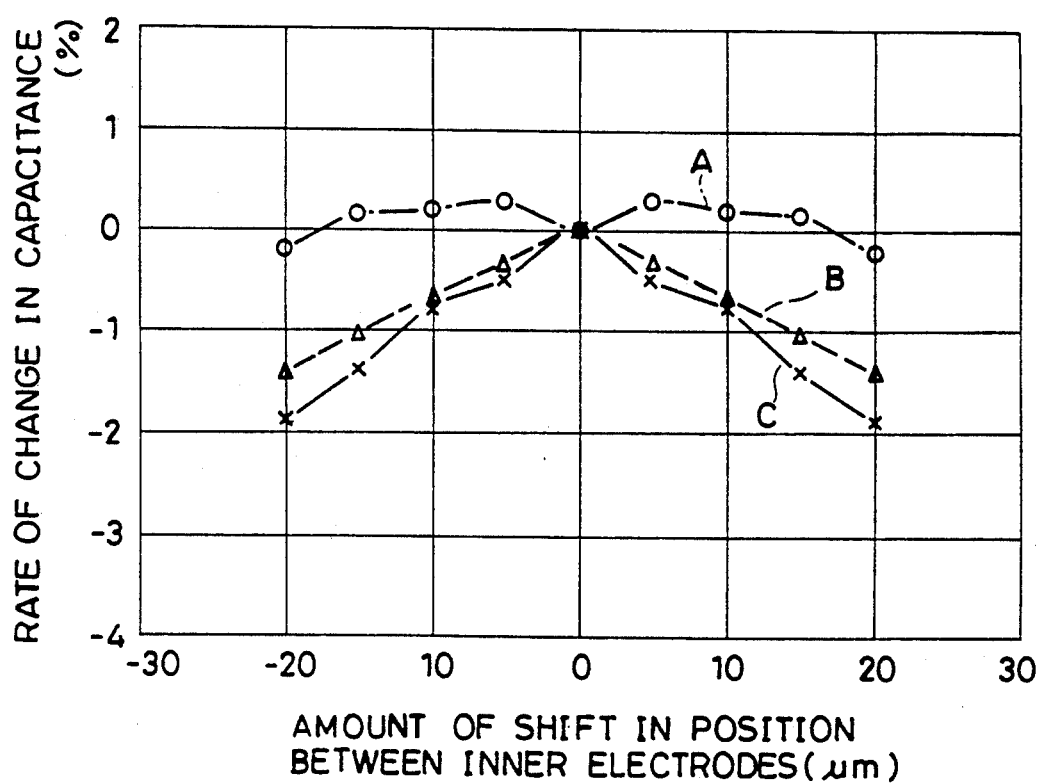
FIG. 7 is a diagram showing the relation between the amount of shift in position between inner electrodes and the rate of change in capacitance in the multilayer capacitor according to the first embodiment and the conventional multilayer capacitors.

Furthermore, the relation between the amount of shift in position between inner electrodes and the rate of change in capacitance is shown in FIG. 7 with respect to the multilayer capacitor according to the above described embodiment and the two types of conventional multilayer capacitors. The rate of change in capacitance is an expression in percentage of the ratio of the amount of change in capacitance in a case where the shift in position occurs between upper and lower inner electrodes to the amount of change in capacitance in a case where no shift in position occurs between inner electrodes.

Figure 16A:
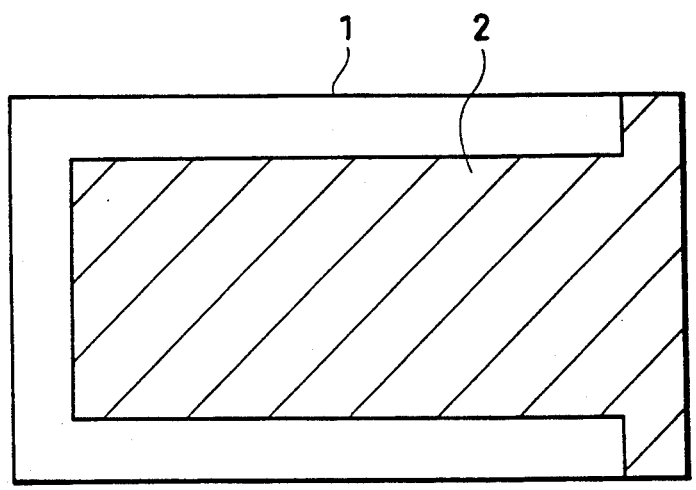
FIGS. 16A and 16B are plan views for explaining the shapes of ceramic green sheets used in one example of the conventional multilayer capacitors and inner electrodes formed thereon, respectively.
Figure 16B:
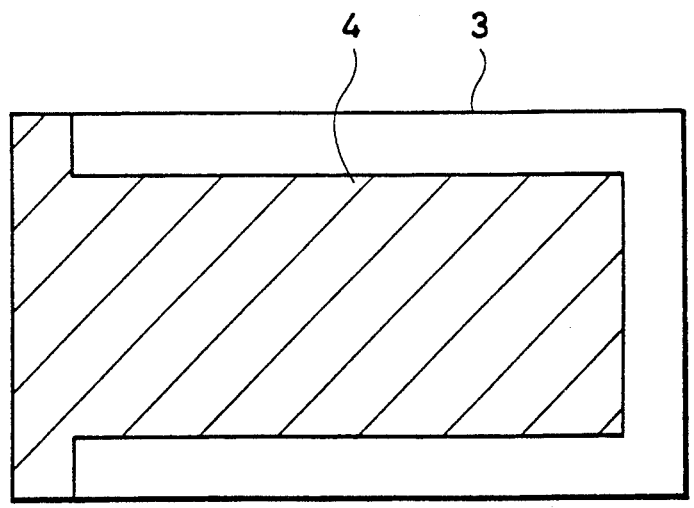
Figure 17A:
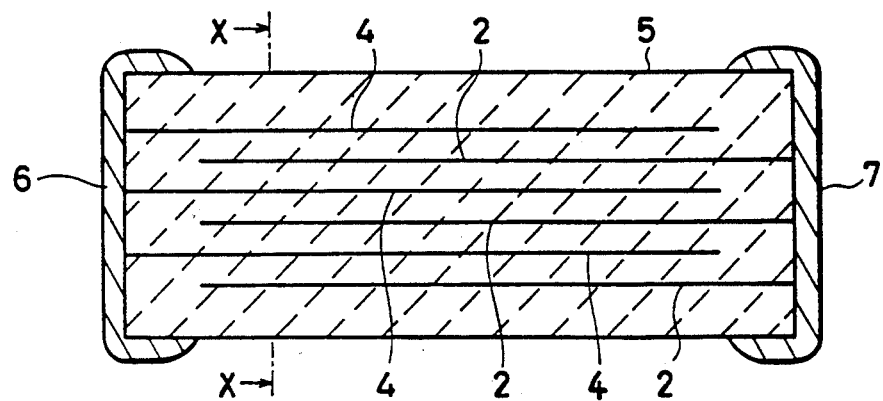
FIGS. 17A and 17B are diagrams for explaining one example of the conventional multilayer capacitors, where
Figure 17B:
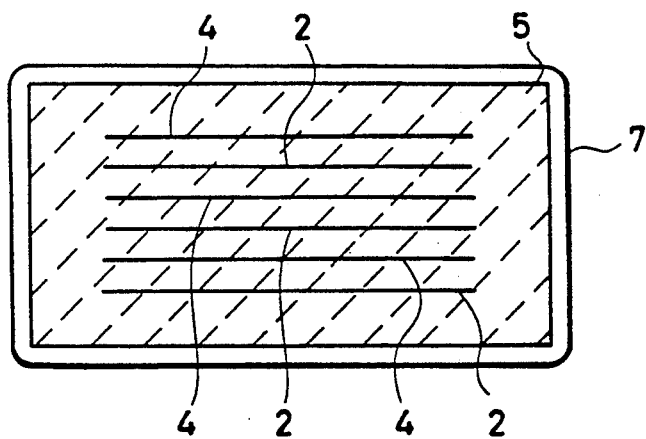

As can be seen from FIGS. 6 and 7, in the multilayer capacitor according to the embodiment, even when the shift in position occurs between the upper and lower inner electrodes, the rate of change in capacitance is smaller, as compared with the conventional multilayer capacitor having a plurality of inner electrode fingers (the multilayer capacitor having inner electrodes shown in FIGS. 18A and 18B), and the capacitance itself is significantly larger, as compared with the conventional multilayer capacitor having no inner electrode fingers (the multilayer capacitor using inner electrodes shown in FIGS. 16A and 16B). Meanwhile, it is preferable that the number of inner electrode fingers in one inner electrode is large so as to increase the capacitance in consideration of the above described edge effect.

A multilayer capacitor is then fabricated by respectively changing the above described dimensions α, β, γ and d shown in FIG. 5 and the total number of inner electrodes in the multilayer capacitor according to the first embodiment to 0.221 mm, 0.261 mm. 0.052 mm and 0.018 mm and to 4. In this case, the above described ratio β/α of the width β of the inner electrode fingers 42b, 42d, 44a and 44c having a relatively large width to the width α of the inner electrode fingers 42a, 42c, 44b and 44d having a relatively small width is 1.18. The widths γ of gaps between the plurality of inner electrode fingers in each of the inner electrodes and the thicknesses d of dielectric layers 47a between the inner electrodes are respectively made constant.

Figure 8:
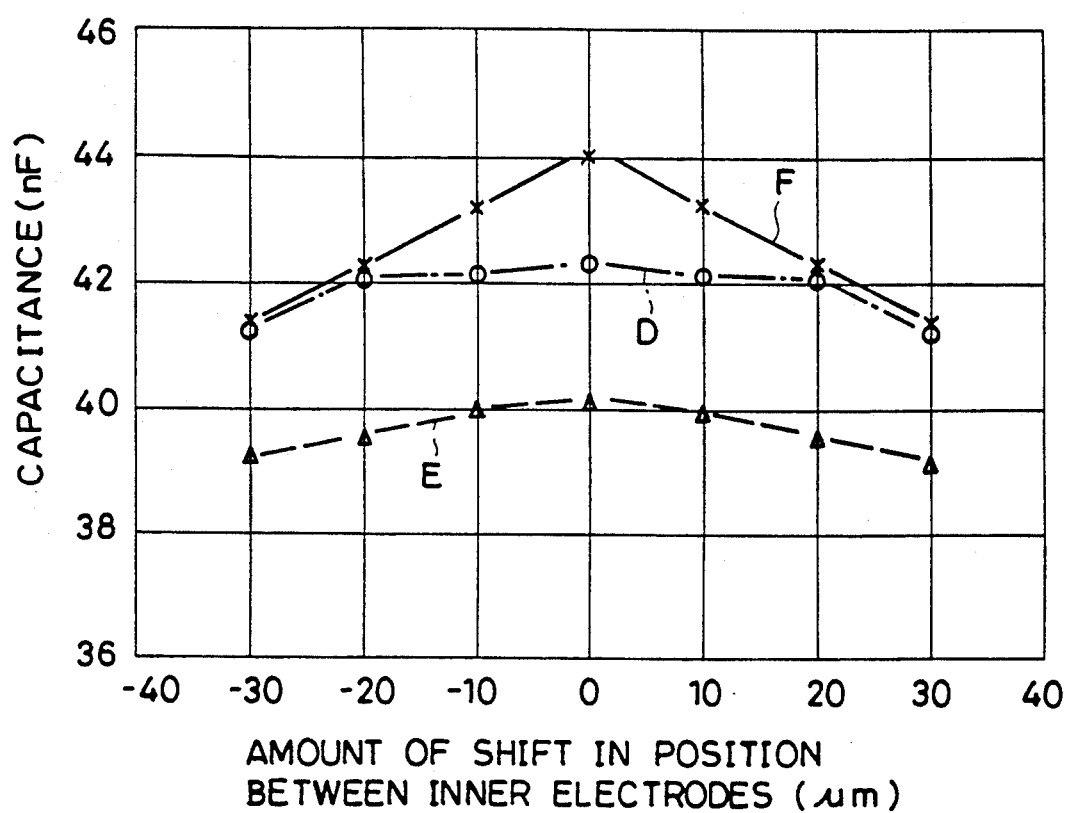
FIG. 8 is a diagram showing the relation between the amount of shift in position between inner electrodes and the capacitance in a multilayer capacitor obtained by altering the number of the inner electrodes and the widths of the inner electrode fingers in the multilayer capacitor according to the first embodiment and the conventional multilayer capacitors.
Figure 9:
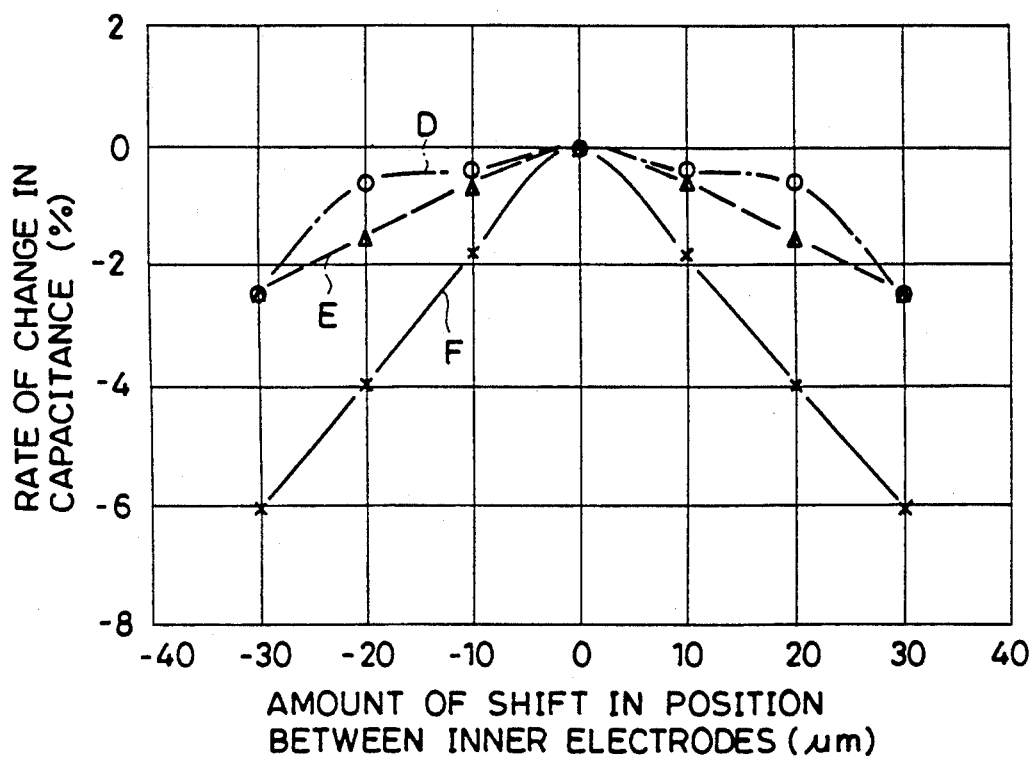
FIG. 9 is a diagram showing the relation between the amount of shift in position between inner electrodes and the rate of change in capacitance in the multilayer capacitor obtained by altering the number of the inner electrodes and the widths of the inner electrode fingers in the multilayer capacitor according to the first embodiment and the conventional multilayer capacitors.

The relation between the amount of shift in position between upper and lower inner electrodes and the capacitance in the multilayer capacitor according to the embodiment constructed as described above is represented by a one dot and dash line D in FIG. 8, and the relation between the amount of shift in position and the rate of change in capacitance is represented by a one dot and dash line D in FIG. 9. For comparison, the relation between the amount of shift in position between inner electrodes and the capacitance, and the relation between the amount of shift in position and the rate of change in capacitance in the conventional multilayer capacitor using inner electrodes shown in FIGS. 16A and 16B are respectively represented by a broken line E in FIGS. 8 and 9. In addition, the relation between the amount of shift in position between inner electrodes and the capacitance, and the relation between the amount of shift in position and the rate of change in capacitance in the multilayer capacitor using inner electrodes shown in FIGS. 18A and 18B are respectively represented by a solid line F in FIGS. 8 and 9.

As can be seen from FIGS. 8 and 9, even when the total number of inner electrodes is four and the above ratio β/α is 1.18, the variation in capacitance is reduced, as compared with the conventional multilayer capacitors, and the capacitance can be increased, as compared with the conventional multilayer capacitor having no inner electrode fingers.

Figure 10:
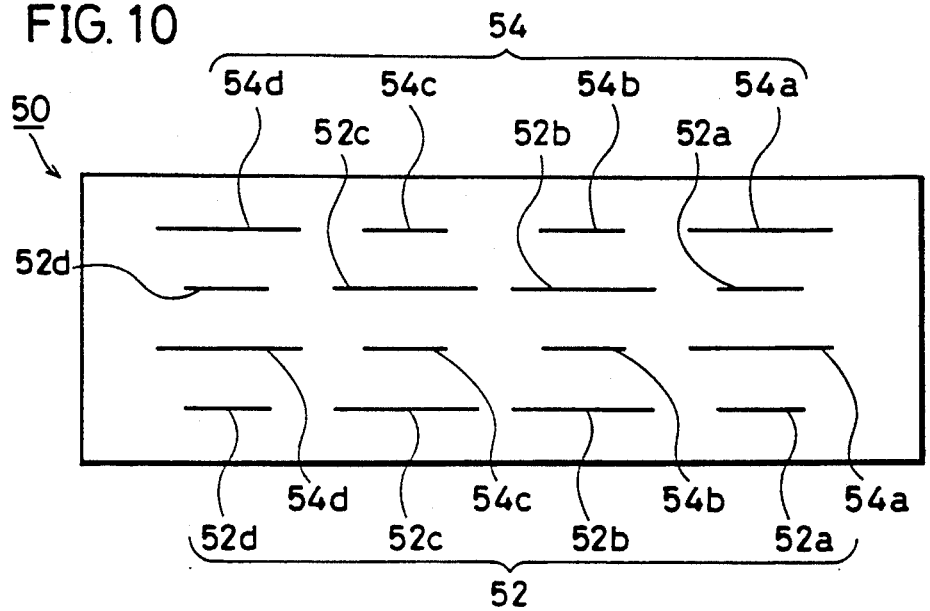
FIG. 10 is a schematic front sectional view for explaining a multilayer capacitor according to a second embodiment of the present invention.

FIG. 10 is a front sectional view showing a multilayer capacitor according to a second embodiment of the present invention. In a multilayer capacitor 50 according to the present embodiment, an inner electrode 52 has inner electrode fingers 52a and 52d having a relatively small width and inner electrode fingers 52b and 52c having a relatively large width. Similarly, the other inner electrode 54 has inner electrode fingers 54b and 54c having a relatively small width and inner electrode fingers 54a and 54d having a relatively large width. More specifically, the inner electrode fingers having a small width and the inner electrode fingers having a large width are not alternately arranged in the present embodiment. Thus, in the present invention, the inner electrode fingers having a small width and the inner electrode fingers having a large width need not be necessarily arranged alternately.

Figure 11:
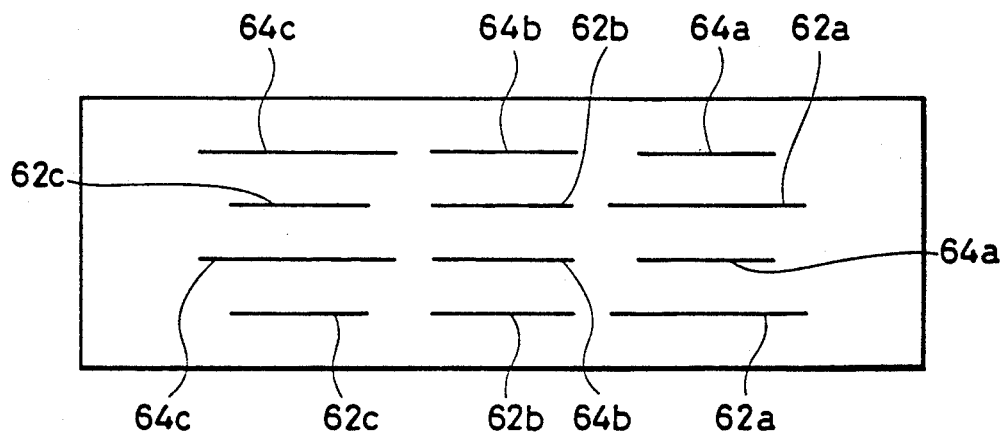
FIG. 11 is a schematic front sectional view for explaining a multilayer capacitor according to a third embodiment of the present invention.

FIG. 11 shows a multilayer capacitor according to a third embodiment of the present invention, in which inner electrode fingers 62b, 62c, 64a and 64b having a small width and inner electrode fingers 62a and 64c having a large width are formed. Thus, in each of inner electrodes 62 and 64, the number of inner electrode fingers having a small width and the number of inner electrode fingers having a large width need not be necessarily made equal to each other.

Meanwhile, in the above described first embodiment, the dimensions α, β and γ and the thickness d of the dielectric layer may be suitably determined depending on the value of capacitance to be a target and the precision in the laminating work at the time of fabrication. Description is made taking as an example the inner electrode fingers 42a and 44a shown in FIG. 5. In this case, it is preferable that the value of β/α is large so as to prevent the inner electrode finger 42a having a small width from being forced out of the inner electrode finger 44a having a large width due to the shift in position. If the value of β/α is too large, however, the distance between inner electrode fingers adjacent to each other in one inner electrode, that is, the width γ of the gap becomes large, to decrease the value of capacitance. Consequently, it is actually preferable that the value of β/α is approximately two or less.

Furthermore, in the multilayer capacitors according to the present invention, it is possible not only to increase the value of capacitance and reduce the variation in capacitance as described above but also to decrease its inductance. More specifically, when a multilayer capacitor is fabricated in which a dielectric body is made of a dielectric material having a dielectric constant of 3200 and the capacitance is 4.7 nF, its ESL (Equivalent Series Inductance) can be reduced by approximately 24% from 114 pH in the conventional multilayer capacitor to 87 pH.

Although in the above described first to third embodiments, the widths of a plurality of inner electrode fingers formed in one inner electrode are of two types, it should be noted that the present invention is not limited to the same. More specifically, one inner electrode may be formed so as to have inner electrode fingers having three or more types of widths. In addition, the widths γ of the gaps between the plurality of inner electrode fingers need not be necessarily made constant but may be made different from each other.

Figure 12:
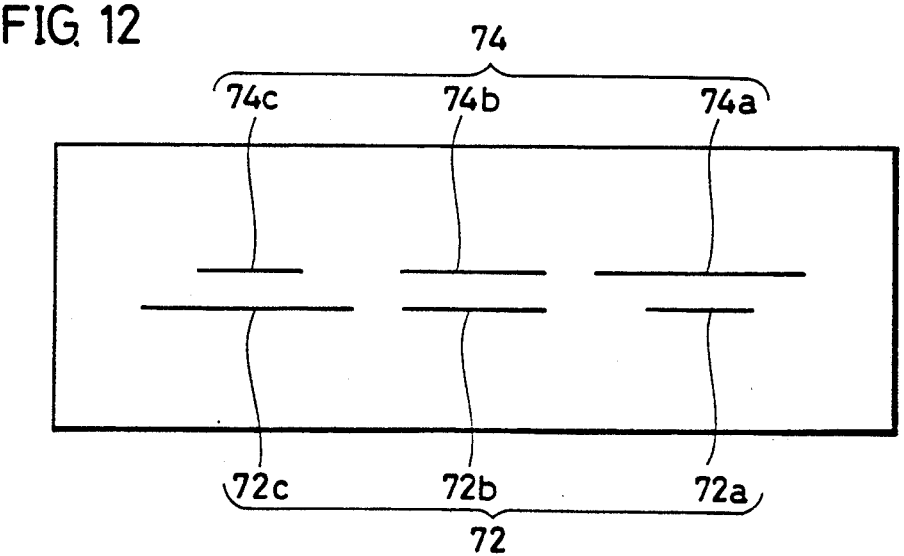
FIG. 12 is a schematic front sectional view for explaining a multilayer capacitor according to a fourth embodiment of the present invention.

In a multilayer capacitor shown in FIG. 12, the widths of a plurality of inner electrode fingers 72a to 72c are made different from each other as described above. Similarly, the widths of inner electrode fingers 74a to 74c are made different from each other. That is, the widths of the plurality of inner electrode fingers constituting one inner electrode are of three types. Herein, the widths of the inner electrode fingers 72b and 74b in central parts of inner electrodes 72 and 74 are the same as shown in FIG. 12. Accordingly, even when the shift in position between the inner electrodes 72 and 74 occurs in the lateral direction, the opposed area between the inner electrode fingers 72b and 74b is decreased so that the capacitance varies. Since the inner electrode fingers 72a having a small width and the inner electrode finger 72c having a large width are respectively opposed to the inner electrode finger 74a having a large width and the inner electrode finger 74c having a small width, however, the variation in capacitance can be reduced, as compared with the conventional multilayer capacitor having a plurality of inner electrode fingers having the same width.

Figure 13:
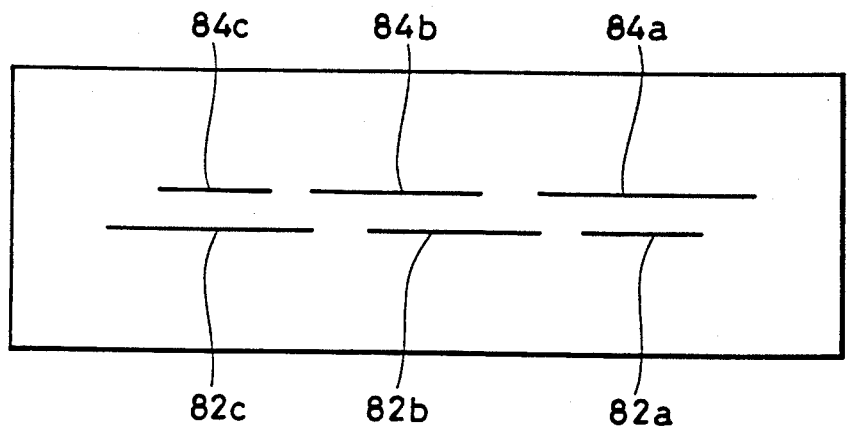
FIG. 13 is a schematic front sectional view for explaining a structure of inner electrodes in a multilayer capacitor according to a fifth embodiment of the present invention.

Furthermore, as shown in FIG. 13, if inner electrode fingers 82b and 84b having a medium width which are located in central parts of inner electrodes are so arranged that parts thereof are respectively overlapped with parts of inner electrode fingers 84a and 82c having a large width in the respective other inner electrodes, the variation in capacitance can be prevented even if there occurs the shift in position in the lateral direction.

In the multilayer capacitors shown in FIGS. 12 and 13, the total number of inner electrodes may be three or more.

Figure 14:
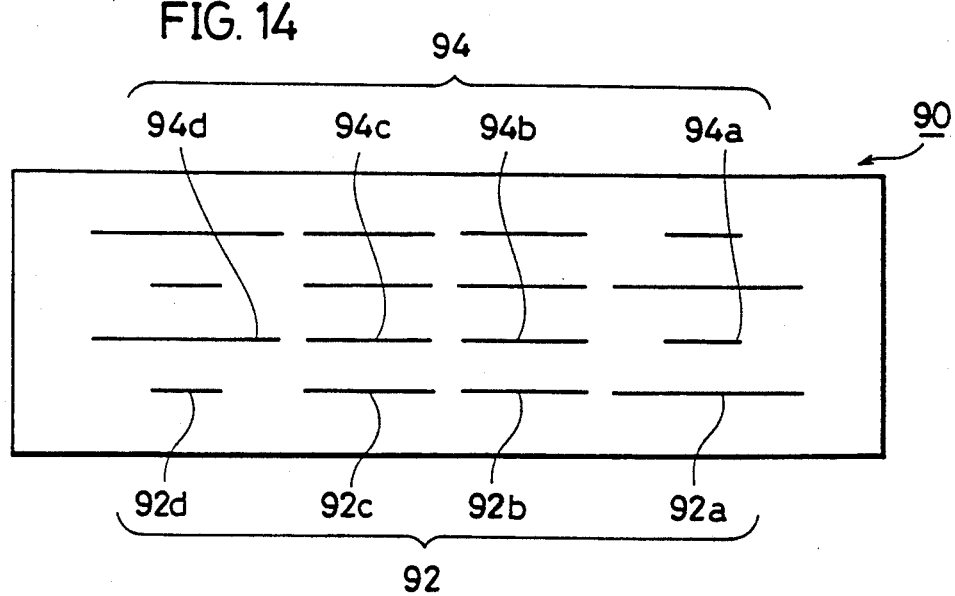
FIG. 14 is a schematic front sectional view showing a multilayer capacitor according to a sixth embodiment of the present invention.

FIG. 14 is a front sectional view showing a multilayer capacitor according to a sixth embodiment of the present invention. In a multilayer capacitor 90 according to the present embodiment, an inner electrode 92 has a plurality of inner electrode fingers 92a to 92d. In this inner electrode 92, the inner electrode finger 92a has a relatively large width, the two inner electrode fingers 92b and 92c have a medium width, and the inner electrode finger 92d has a relatively small width. Similarly, also in an inner electrode 94, an inner electrode finger 94a has a relatively small width, two inner electrode fingers 94b and 94c have a medium width, and an inner electrode finger 94d has a relatively large width.

In the embodiment shown in FIG. 14, the inner electrode fingers 92b, 92c, 94b and 94c which are arranged in internal parts of the inner electrodes are formed so as to have the same width. On the other hand, the inner electrode fingers 92a and 94a and the inner electrode fingers 92d and 94d which are located in both ends of the inner electrodes and are opposed to each other while being separated by a dielectric layer are formed so as to respectively have different widths.

Figure 15:
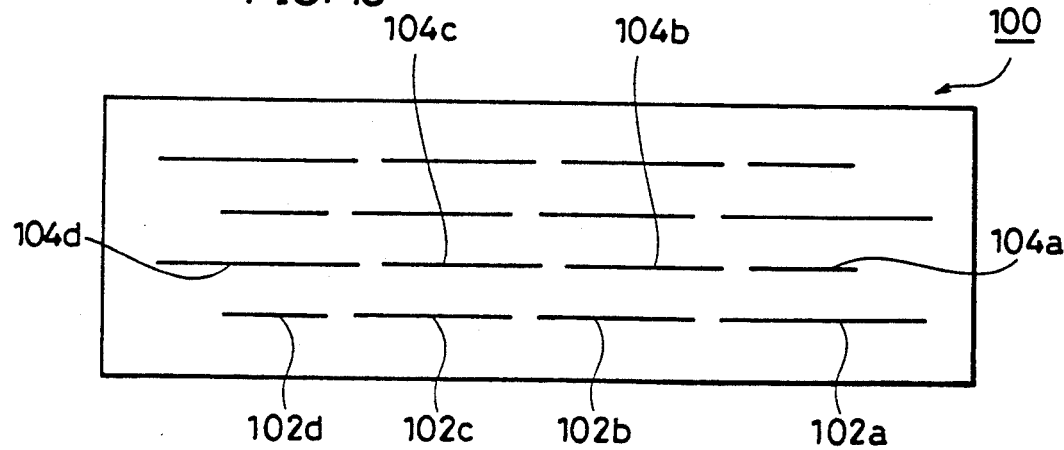
FIG. 15 is a schematic front sectional view showing a multilayer capacitor according to a seventh embodiment of the present invention.

FIG. 15 shows a multilayer capacitor 100 according to a seventh embodiment of the present invention. Also in the present embodiment, inner electrode fingers 102b, 102c, 104b and 104c having a medium width which are located in central parts of inner electrodes are so arranged that parts thereof are respectively overlapped with parts of inner electrode fingers having a medium width or a large width in the respective other inner electrodes. Consequently, in the multilayer capacitor 100 having a structure shown in FIG. 15, the variation in capacitance created when there occurs the shift in position between inner electrodes in the lateral direction can be prevented more effectively, as compared with the multilayer capacitor 90 according to the embodiment shown in FIG. 14.

In each of the multilayer capacitors according to the above described embodiments, the larger the number of inner electrodes laminated is, the larger the number of electric fields based on gaps superimposed is. Consequently, as can be presumed from the above described results of FIGS. 6 and 8, even if the area of each of the inner electrodes is made smaller, as compared with the conventional multilayer capacitors, it is possible to obtain almost the same capacitance as that in the conventional multilayer capacitor shown in FIG. 16A to FIG. 17B using rectangular inner electrodes having no gaps formed therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multilayer capacitor having a laminated structure comprising a plurality of inner electrodes which are laminated while being separated by dielectric layers, comprising:
    a dielectric body,
    a plurality of inner electrodes arranged in said dielectric body so as to be overlapped with each other in the direction of thickness of said dielectric layers while being separated by said dielectric layers,
    each of said inner electrodes having a plurality of inner electrode fingers which are separated by gaps, and respective ones of the plurality of inner electrode fingers being of at least two different widths, and
    outer electrodes formed on a pair of end surfaces of said dielectric body and electrically connected to predetermined inner electrodes of said plurality of inner electrodes.

2. The multilayer capacitor according to claim 1, wherein in a pair of inner electrodes which are overlapped with each other while being separated by a dielectric layer, the width of at least one inner electrode finger on an upper side and the width of an inner electrode finger on a lower side which is overlapped with the inner electrode finger on the upper side are different from each other.

3. The multilayer capacitor according to claim 2, wherein in a pair of inner electrodes which are overlapped with each other while being separated by a dielectric layer, the widths of the inner electrode fingers on the upper side and the widths of inner electrode fingers on the lower side which are overlapped with the inner electrode fingers on the upper side are respectively all different from each other.

4. The multilayer capacitor according to claim 1, wherein respective ones of said inner electrode fingers are of two different widths.

5. The multilayer capacitor according to claim 4, wherein each said plurality of inner electrode fingers comprises inner electrode fingers having two types of widths, that is, inner electrode fingers having a relatively large width and inner electrode fingers having a relatively small width,
    said inner electrode fingers having a relatively large width and said inner electrode fingers having a relatively small width being alternately arranged.

6. The multilayer capacitor according to claim 5, wherein in a pair of inner electrodes which are overlapped with each other while being separated by a dielectric layer, one inner electrode finger having a relatively large width in the inner electrode above the dielectric layer, and one inner electrode finger having a relatively small width in the inner electrode beneath the dielectric layer, which is overlapped with the inner electrode finger having a relatively large width, are arranged,
    the ratio of the width of the inner electrode finger having a relatively large width to the width of the inner electrode finger having a relatively small width being two or less.

7. The multilayer capacitor according to claim 1, wherein respective ones of said inner electrode fingers are of three different widths.

8. The multilayer capacitor according to claim 1, wherein each of said inner electrodes has a connecting conductive portion for connecting the plurality of inner electrode fingers,
    the plurality of inner electrode fingers being electrically connected to each other by the connecting conductive portion.

9. The multilayer capacitor according to claim 1, wherein the widths of the gaps between said plurality of inner electrode fingers are constant.

10. The multilayer capacitor according to claim 1, wherein said dielectric body is a ceramic sintered body.

11. The multilayer capacitor according to claim 1, wherein the width of at least one of the gaps between said plurality of inner electrode fingers is different from the width of another of the gaps.

12. A multilayer capacitor having a structure in which a plurality of inner electrodes are laminated while being separated by dielectric layers, comprising:

a dielectric body, a plurality of inner electrodes arranged in said dielectric body so as to be overlapped with each other in the direction of thickness while being separated by dielectric layers, each of said inner electrodes having a plurality of inner electrode fingers formed while being separated by gaps, and the widths of the plurality of inner electrode fingers being of at least two types, and outer electrodes formed on a pair of end surfaces of said dielectric body so as to be electrically connected to predetermined inner electrodes out of said plurality of inner electrodes;

wherein the width of at least one of the gaps between said plurality of inner electrode fingers is different from the rest of the gaps.

* * * * *